US006727816B1

(12) United States Patent
Helgeson (10) Patent No.: US 6,727,816 B1
(45) Date of Patent: Apr. 27, 2004

(54) WIRELESS SYSTEM WITH VARIABLE LEARNED-IN TRANSMIT POWER

(75) Inventor: Michael A. Helgeson, Eagan, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/311,250

(22) Filed: May 13, 1999

(51) Int. Cl.$^7$ ................................................ G08B 21/00
(52) U.S. Cl. ............. 340/540; 340/825.06; 340/825.36; 340/540; 340/539; 340/10.1; 340/10.34; 455/13.4; 455/38.3
(58) Field of Search ................. 340/825.06, 825.36, 340/502, 505, 531, 538, 539, 540, 825.72, 825.73, 825.76, 10.1, 10.3, 10.34, 10.4, 10.41, 10.5; 455/13.4, 38.3, 574

(56) References Cited

U.S. PATENT DOCUMENTS

| 3,643,183 A | | 2/1972 | Geffe | ........................ 333/80 R |
| 3,715,693 A | | 2/1973 | Fletcher et al. | ........... 333/80 T |
| 3,758,885 A | | 9/1973 | Voorman et al. | .......... 333/80 T |
| 4,264,874 A | | 4/1981 | Young | ........................ 330/277 |
| 4,529,947 A | | 7/1985 | Biard et al. | ................... 330/259 |
| 4,550,312 A | * | 10/1985 | Galloway et al. | ........... 340/539 |
| 4,812,785 A | | 3/1989 | Pauker | ................. 331/117 FE |
| 4,868,795 A | * | 9/1989 | McDavid | ............... 340/870.04 |
| 4,933,668 A | * | 6/1990 | Oyer et al. | ................... 340/541 |
| 4,968,966 A | * | 11/1990 | Jasinski et al. | ......... 340/825.44 |
| 5,003,619 A | * | 3/1991 | Morris et al. | ................... 455/69 |
| 5,063,371 A | * | 11/1991 | Oyer et al. | ................... 340/541 |
| 5,392,003 A | | 2/1995 | Nag et al. | .................... 330/254 |
| 5,395,042 A | * | 3/1995 | Riley et al. | ..................... 236/46 |
| 5,428,388 A | * | 6/1995 | von Bauer et al. | ......... 348/155 |
| 5,430,409 A | | 7/1995 | Buck et al. | ..................... 330/2 |
| 5,451,898 A | | 9/1995 | Johnson | ....................... 327/563 |
| 5,465,399 A | * | 11/1995 | Oberholtzer et al. | |
| 5,613,228 A | * | 3/1997 | Tuttle et al. | ................. 455/127 |
| 5,642,071 A | | 6/1997 | Sevenhans et al. | ......... 327/359 |
| 5,726,603 A | | 3/1998 | Chawla et al. | ............... 330/269 |
| 5,767,664 A | | 6/1998 | Price | .......................... 323/987 |
| 5,809,013 A | | 9/1998 | Kackman | ..................... 370/253 |
| 5,847,623 A | | 12/1998 | Hadjichristos | .............. 332/105 |
| 5,867,763 A | * | 2/1999 | Dean et al. | .................. 455/5.1 |
| 6,075,513 A | * | 6/2000 | Reddy et al. | ................ 345/112 |
| 6,366,572 B1 | * | 4/2002 | Esterberg et al. | ........... 455/446 |

FOREIGN PATENT DOCUMENTS

| EP | 0565507 A | * | 10/1993 |
| WO | 9307702 A | * | 4/1993 |
| WO | 9818225 A | * | 4/1998 |

OTHER PUBLICATIONS

Rofougaran et al., "A 900 MHz CMOS RF Power Amplifier with Programmable Output Power", *Proceedings VLSI Circuits Symposium*, Honolulu, Jun. 1994, pp. 133–134.

(List continued on next page.)

*Primary Examiner*—Jeffery Hofsass
*Assistant Examiner*—Daniel Previl (57) ABSTRACT

A building monitoring and control system is disclosed that includes a bi-directional radio link between master and remote units, wherein the remote units adjust transmission power to a level adequate for communication but not so high as to waste power and unnecessarily decrease battery life. In one embodiment, the master unit measures a received signal strength from the remote units and uses that measure to provide feedback to the remote units as to whether their transmissions are too strong, too weak, or within an acceptable range. In another embodiment, the remote units receive an analog measure of the master unit received signal strength and use that measure as an indication of whether to increase or decrease the transmission strength. In yet another embodiment, the lack of an acknowledgement from the master is used as an indication that the remote signal is not strong enough.

20 Claims, 6 Drawing Sheets

OTHER PUBLICATIONS

Rofougaran et al., "A 1 GHz CMOS RF Front–End IC for a Direct–Conversion Wireless Receiver", IEEE Journal of Solid–State Circuits, vol. 31, Jul. 1996, pp. 880–889.

Image–Rejection in Mixers, copyright AAA, 1996.

Wilson et al., "A Single–Chip VHF and UHF Receiver for Radio Paging", *IEEE Journal of Solid State Circuits*, vol. 26, No. 12, Dec. 1991, pp. 1945–1950.

Crols et al., "CMOS Wireless Transceiver Design", Kluwer Academic Publishers, 1997, pp. 17–23.

Chang et al., "A CMOS Channel–Select Filter for a Direct–Conversion Wireless Receiver", to appear in *IEEE Journal of Solid–State Circuits*, Apr. 1999.

Asad A. Abidi, "Direct–Conversion Radio Transceivers for Digital Communications", *IEEE Journal of Solid–State Circuits*, vol. 30, No. 12, Dec. 1995, pp. 1399–1410.

Behzad Razavi, "Design Considerations for Direct–Conversion Receivers", *IEEE Transactions on Circuits and Systems—II: Analog and Digital Signal Processing*, vol. 44, No. 6, Jun. 1997, pp. 428–435.

Thomas H. Lee, "The Design of COMS Radio–Frequency Integrated Circuits", Cambridge University Press, 1998, pp. 344–351.

Product Specification for Advanced Pager Receiver UAA2082, Integrated Circuits, Jan. 16, 1996.

Moulding et al., "Gyrator Video Filter IC with Automatic Tuning", *IEEE Journal of Solid–State Circuits*, vol. SC15, No. 6, Dec. 1980, pp. 963–968.

\* cited by examiner

FIG. 7

WIRELESS SYSTEM WITH VARIABLE LEARNED-IN TRANSMIT POWER

CROSS REFERENCE TO CO-PENDING APPLICATIONS

The present application is related to U.S. patent application Ser. No. 09/311,242, filed May 15, 1999, entitled "Output Buffer With Independently Controllable Current Mirror Legs"; U.S. patent application Ser. No. 09/311,105, filed May 13, 1999, entitled "Differential Filter with Gyrator"; U.S. patent application Ser. No. 09/311,234, filed May 13, 1999, entitled "Compensation Mechanism For Compensating Bias Levels Of An Operation Circuit In Response To Supply Voltage Changes"; U.S. patent application Ser. No. 09/311,092, filed May 13, 1999, entitled "State Validation Using Bi-Directional Wireless Link"; U.S. patent application Ser. No. 09/311,246, filed May 13, 1999, entitled "Filter With Controlled Offsets For Active Filter Selectivity and DC Offset Control"; and U.S. patent application Ser. No. 09/311,014, filed May 13, 1999, entitled "Wireless Control Network With Scheduled Time Slots", all of which are assigned to the assignee of the present invention and incorporated herein by reference.

FIELD OF THE INVENTION

The present invention relates generally to building monitoring and control for commercial and residential use. More specifically, the present invention relates to building monitoring and control systems including security, HVAC and other systems utilizing wireless, bi-directional radio frequency communication between master units and remote units. In particular, the present invention relates to remote units having adjustable transmission power for providing communication while conserving power to extend battery life.

BACKGROUND OF THE INVENTION

Building monitoring and control systems including security systems, HVAC and other monitoring and control systems are in increasing use in both commercial buildings and residential dwellings. For security systems, the increasing use is due, in part, to a long-term perception of increasing crime rates along with increasing awareness of the availability of building monitoring and security systems. For HVAC systems, the increasing use is due, in part, to the desire to reduce heating and cooling costs, and to save energy.

A building monitoring and/or control system typically includes a variety of remote units coupled to detection devices and at least one master unit which typically resides in a central location in the building and can include annunciation functions and reporting functions to another location such as a central reporting service or police department. Remote units have, in the past, been hard wired to the master unit. For example, in a security system, reed switches or Hall effect switches are often disposed near magnets located near doors and door jambs, with a door opening making or disrupting continuity, with the resulting signal being received by the master unit.

In hard wired systems the remote units and the detection devices may be nearly one in the same. For example, the detection device may be a foil trace on a glass pane and the remote unit may be wire terminals with optional signal conditioning equipment leading to a wire pair connected to the master unit. Hard wired units can be installed most easily in new construction, where running wire pairs is easier than in existing buildings. Installing hard-wired systems can be very expensive in existing buildings due, in part, to the labor costs of snaking wires through existing walls and ceilings. In particular, on a point-by-point basis, retrofitting residential dwellings can be expensive because houses are often not designed to be continually changed, as are many office buildings. For example, most houses do not have dropped ceilings and utility closets at regular intervals. Houses can have higher aesthetic expectations than commercial office buildings, requiring greater care in installing and concealing wiring.

Wireless security systems have become increasingly common. Existing systems use radio frequency transmission, often in the 400 MHz range. Wireless systems can greatly reduce the need for wiring between remote and master unit or units. In particular, wireless systems can communicate between the remote units and the master units without wiring. Remote units still require power to operate, and can require wiring to supply that power, which can add a requirement for power wiring where the power had been provided in hard wired systems over the wiring used to communicate between remote units and the master unit. The power requirement can partially negate the wireless advantage of radio frequency units, as some wiring is still required. The power supply wiring requirement is often eliminated with use of batteries. Battery life is largely a function of power consumption of the remote units. The power consumption is dependent upon both the electronics and upon the transmission duty cycle of the unit.

Current wireless systems typically utilize remote units that can only transmit and master units that can only receive. Accordingly, remote units often transmit messages for needlessly long periods, and at higher power levels than is required, as there is no bi-directional capability, and therefore no way for the master unit to acknowledge receipt of the first remote unit message, or a low power message. What would be desirable, therefore, is a bi-directional wireless monitoring system that can acknowledge receipt of a data message or a low power message. What would also be desirable is a bi-directional wireless monitoring system that uses the acknowledge feature to dynamically adjust the remote unit transmission power to minimize power consumption and extend battery life.

SUMMARY OF THE INVENTION

The present invention includes a building monitoring and/or control system that includes bi-directional radio frequency links between master and remote units that can acknowledge receipt of a data message or a low power message sent from the remote unit to the master unit. The bi-directional wireless monitoring system may then use the acknowledge signal, or the lack thereof, to dynamically adjust the remote unit transmission power to minimize power consumption and extend battery life. The by-directional radio frequency links also increase the reliability of the communication link. The transmit power level is preferably set high enough to enable adequate communication, but low enough to not be wasteful of battery life. The optimum transmit power may dynamically change over time with the movement of people, furniture, or even walls within the building environment.

In one embodiment, the remote units use the failure of the master unit to provide an acknowledge signal to the remote unit as an indication of insufficient transmit power at the remote unit. The remote unit may increase the transmit power level, and reinitiate the transmission. This may be repeated until an acknowledge signal is received from the master unit, indicating that an optimum power level has been achieved.

In another embodiment, the master unit is able to measure the received signal strength from the remote units. The master unit may then transmit the received signal strength back to the remote units. The remote units can then increase, decrease, or leave unchanged the remote unit transmit power, as appropriate. Alternatively, or in addition to, the master unit may measure the received signal strength and make a decision within the master unit as to what the remote unit should do regarding the remote unit signal strength. The master unit then sends the remote unit a signal indicating that an increase, decrease, or no change in the remote unit transmit power should be applied.

The present invention allows for dynamically adjusting the power level of remote unit transmissions. The dynamic adjustment is preferably automatic, without requiring manual intervention or service calls. The present invention may adjust for movement of people, furniture, and even walls without requiring any human intervention.

DETAILED DESCRIPTION OF THE INVENTION

Figure 1A:
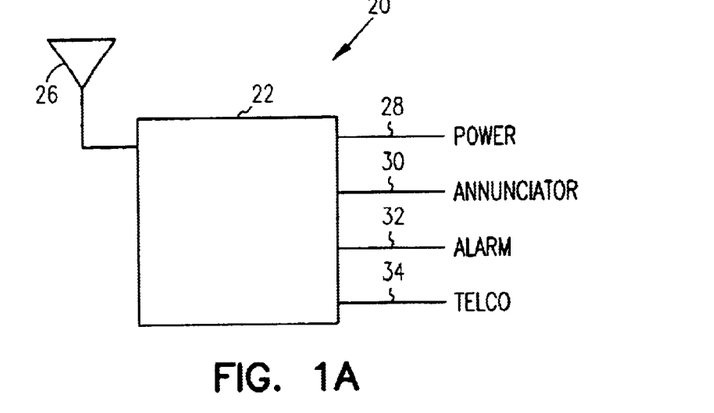
FIGS. 1A, 1B, and 1C are a block diagram of a wireless monitoring and control system having a master unit and two remote units.
Figure 1B:
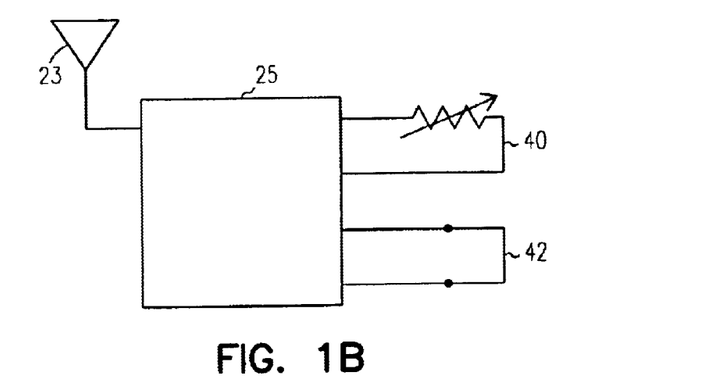
Figure 1C:
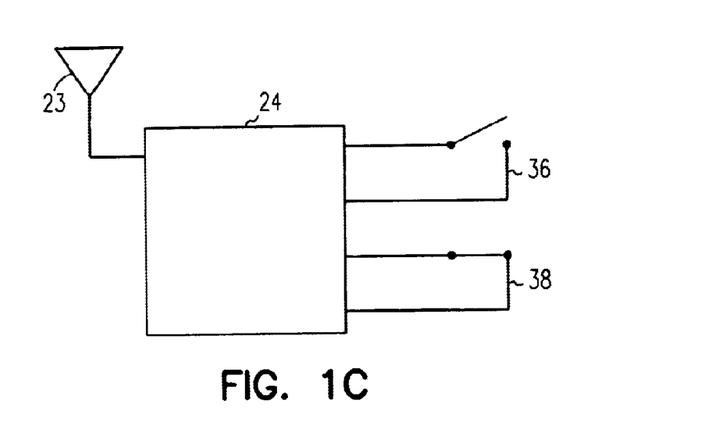

FIGS. 1A, 1B, and 1C illustrate a wireless monitoring and control system 20 including a master unit 22 and two wireless remote units 24 and 25. Master unit 22 includes an antenna 26, a power supply line 28, annunciator panel output line 30, alarm device output line 32, and telephone line 34. A building monitoring and/or control system according to the present invention typically has at least one master unit which is commonly powered with AC line power but can be battery powered, or have battery back-up power. Remote unit 24 includes an antenna 23 and is coupled to two discrete sensor inputs 36 and 38. Sensor input 36 is a normally open sensor and sensor input 38 is a normally closed input. Sensors 36 and 38 can be reed switches or Hall effect devices coupled to magnets used to sense door and window opening and closing. Sensor 38 can be a foil continuity sensor used to detect glass breakage. Remote unit 25 includes antenna 23 and two analog sensors 40 and 42. Sensor 40 is a variable resistance device and security sensor 42 is a variable voltage device. Analog sensors can measure variables such as vibration, noise, temperature, movement, and pressure. Sensors typically sense or measure variables and output data. The data can be binary or discrete, meaning on/off. Data can also be continuous or analog, meaning having a range of values. Analog data can be converted to digital form by using an A/D converter.

Examples of sensors include intrusion sensors such as door switches, window switches, glass breakage detectors, and motion detectors. Safety sensors such as smoke detectors, carbon monoxide detectors, and carbon dioxide detectors are also examples of sensors suitable for use with the current invention. Other sensors include temperature sensors, water detectors, humidity sensors, light sensors, damper position sensors, valve position sensors, electrical contacts, BTU totalizer sensors, and water, air and steam pressure sensors. In addition to sensors, output devices can also be included with the present invention. Examples of output devices include valve actuators, damper actuators, blind positioners, heating controls, and sprinkler head controls. In one embodiment, remote devices having output capabilitity utilize circuitry identical or similar to the circuitry used for sensors, particularly for the communication and controller portions of the devices. Remote devices coupled to output devices typically are hard wired to power sources as they typically consume more power than the sensor input devices. For this reason, remote devices having output devices may not benefit as much from the power saving features of the present invention.

A building monitoring and/or control system according to the present invention can have a large number of remote units which can be spread over an area covered by the RF communication. One system can have remotes located about 5,000 feet (of free space) away from the master unit. The actual distance may be less due to intervening walls, floors and electromagnetic interference in general. Systems can have repeater units as well, units that receive and re-transmit messages to increase the area covered. In some systems, repeaters have a receiver coupled to a transmitter by a long, hard-wired link, allowing separate areas to be covered by one master unit.

Figure 2:
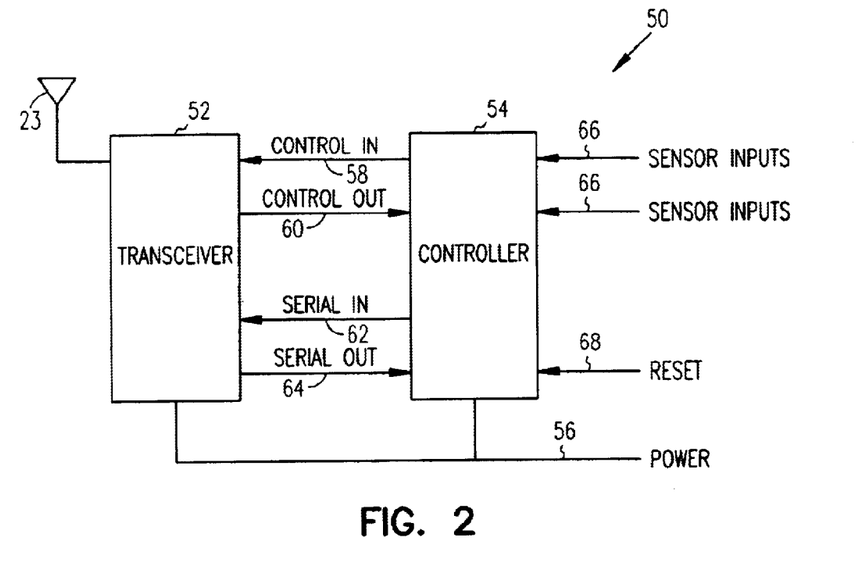
FIG. 2 is a block diagram of a wireless remote unit having a transceiver coupled to a controller.

Referring now to FIG. 2, a wireless remote unit 50 is illustrated in further detail, including antenna 23, a transceiver 52, and a controller 54. Transceiver 52 and controller 54 are each coupled to power source 56 in the embodiment illustrated. Controller 54 includes a programmable microprocessor such as the PIC microprocessor in one embodiment. In another embodiment, the controller is formed primarily of a once-programmable or writeable state machine. Transceiver 52 is preferably a UHF transceiver, transmitting and receiving in the 400 or 900 MHz range. Transceiver 52, in one embodiment, can be set to transmit and receive on different frequencies and to rapidly switch between frequencies. While transceiver 52 can include the capability to transmit and receive simultaneously, in a preferred embodiment, transceiver 52 can only either receive or transmit, but not both at the same time. In the embodiment illustrated, controller 54 is coupled to transceiver 52 with control input line 58, control output line 60, serial input line 62, and serial output line 64.

Control input line 58 can be used to reset the transceiver, to set modes, and to set transmit and receive frequencies. Control output line 60 can be used by signal controller 54 to determine when communication receptions or transmissions have been completed. Serial input line 62 can be used to feed messages to be transmitted to transceiver 52 as well as frequencies to be used and other control parameters. Serial output line 64 can be used to provide messages received from transceiver 52 to controller 54 and can be used to convey information about the signal strength to controller 54. The controller and serial lines can, of course, be used for any purpose and the uses discussed are only a few examples of such uses in one embodiment. In some embodiments, the serial lines are used to convey both status and control data.

Remote unit 50 can also include sensor input lines 66 for coupling to security sensors and other devices. A reset line 68 can be coupled to a reset button to reset remote unit 50 when re-initialization of the unit is desired, such as at the time of installation or after battery changes. In some embodiments, battery power resumption serves as the reset function. A power line 56 is illustrated supplying both transceiver 52 and controller 54. In some embodiments, power is supplied directly to only the controller portion or the transceiver portion, with the controller portion supplied from the transceiver portion or visa versa. In the embodiment illustrated, controller 54 and transceiver 52 are shown separately for purposes of illustrating the present invention. In one embodiment, both controller 54 and transceiver 52 are included on the same chip, with a portion of the gates on board the chip dedicated for use as controller logic in general or used as a user programmable microprocessor in particular. In one embodiment, a PIC microprocessor is implemented on the same chip as the transceiver using CMOS logic and the PIC microprocessor is user programmable in an interpreted BASIC or JAVA language.

Figure 3:
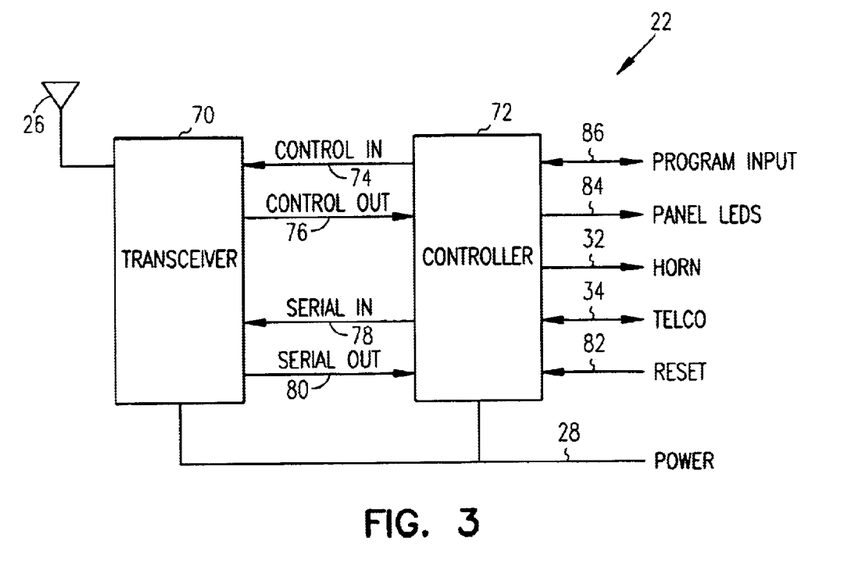
FIG. 3 is a block diagram of a master unit having a transceiver coupled to a controller.

Referring now to FIG. 3, master unit 22 is illustrated, including a transceiver portion 70 and a controller portion 72. Master unit 22 includes control lines 74 and 76 and serial lines 78 and 80. Reset line 82 is included in the embodiment illustrated as is a programmable input line 86, a panel LED output line 84, horn output line 32 and telephone line 34. Programmable input line 86 can be used for many purposes, including down loading control logic, inputting keyboard strokes, and inputting lines of BASIC or JAVA code to be interpreted and executed. Panel LED line 84 can be used to control panel-mounted LEDs giving status information. Horn line 32 can be used to activate alarm horns or lights. Telephone line 34 can be used for automatic dial out purposes to report security breaches to a reporting service or to the police.

In one embodiment, master unit 22 and remote unit 50 share a common chip containing the transceiver and controller logic. In one embodiment, the transceiver and controller are both on board the same chip used in the remote units but the controller portion is supplanted, replaced, or augmented by additional programmable controller functionality such a personal computer. In many embodiments of the present invention, the master controller or controllers may require additional programmable functionality relative to the functionality required on the remote units.

In one embodiment of the present invention, the transceiver portion of the remote unit can operate in at least three modes. In one mode, the transceiver operates in a very low power "sleep" mode, wherein the transceiver is neither transmitting nor receiving. The transceiver can be awakened from the sleep mode by external control signals, such as provided by control lines coming from the control logic portion of the remote unit. In one embodiment of the invention, only the controller can change the state of the transceiver through the control lines such as control lines 58 and 60 in FIG. 2. In a preferred embodiment, at least three events can awaken the transceiver from the sleep mode. One event is the occurrence of a sensor data change, such as a door switch opening, or a significant percentage change of an analog variable. Another event is the lapse of a preset time interval, such as the lapse of the time interval between scheduled health status transmissions by the remote, or between scheduled health status polls by the master unit for which the remote desires to be awake. Yet another event is the resetting of the remote, such as resetting of reset line 68 in FIG. 2.

In one embodiment, remote units can be configured or programmed to transmit sensor data only on a timeout occurrence or on a change occurrence. For example, a temperature sensor may be configured to transmit every half-hour or upon a one (1) degree change from the last transmission. This can greatly reduce power consumption.

In one embodiment, the controller portion of the remote unit can run in a low power mode, but is able to process external signals and interrupts. In one embodiment, timing is handled by timers on board the chip housing the transceiver and controller. In this embodiment, the controller logic is able to process timing functions while in a low power mode. In another embodiment, timing is handled by circuitry external to the microprocessor, with the microprocessor being able to respond to interrupts but not being able to handle the timing functionality. In this embodiment, the timing can be handled by an RC timer or a crystal oscillator residing external to the microprocessor, allowing the microprocessor to lie in a very low power consumption mode while the external timing circuitry executes the timing functionality. In one embodiment, the timing and microprocessor circuitry both reside on the same chip, but can run in different power consumption modes at the same time. In one embodiment, the remote, not including timing circuitry, initializes in a normal power consumption mode, sleeps in a very low power consumption mode, which, when interrupted, executes in a normal power consumption mode while transmitting or receiving.

Figure 4:
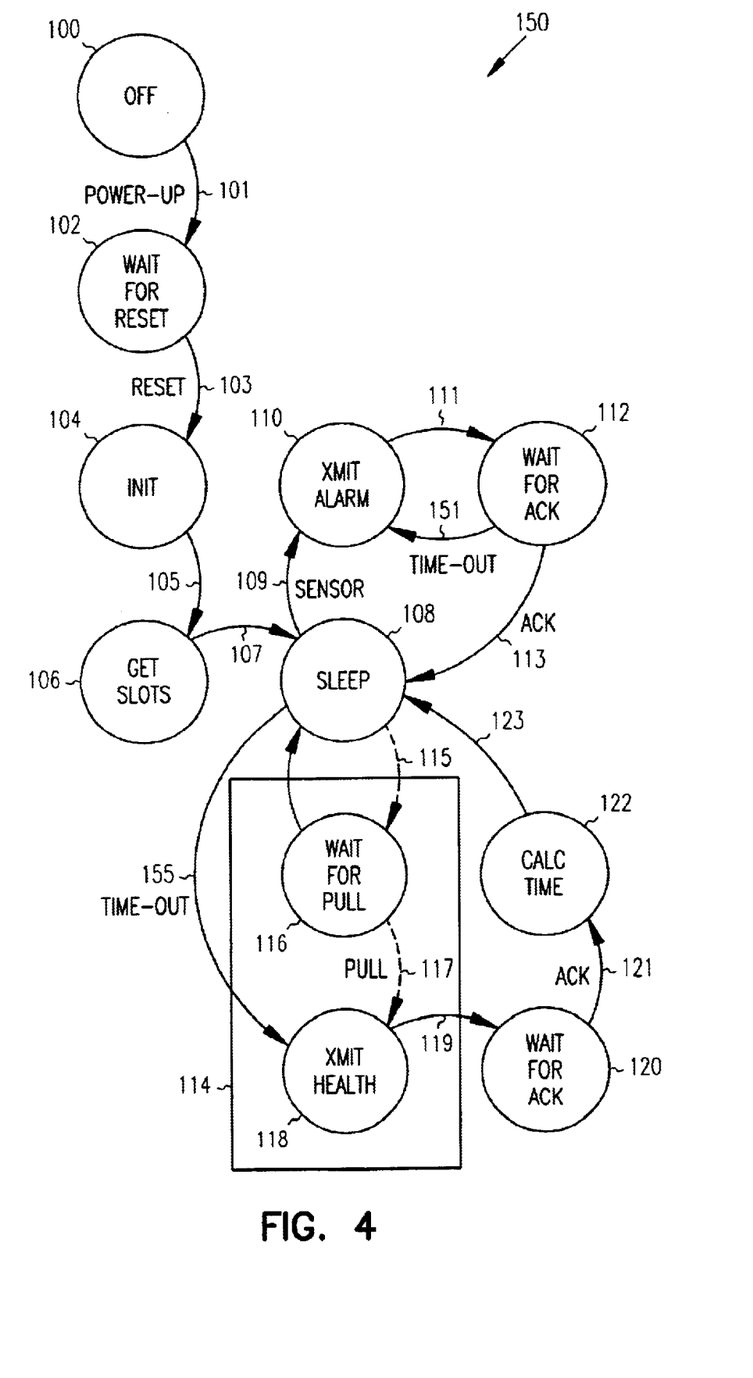
FIG. 4 is a state transition diagram of a process which can execute in a remote unit.

Referring now to FIG. 4, one method, process, or algorithm 150 according to the present invention is illustrated in a state transition diagram. Process 150 can be used for operating a remote unit such as remote unit 50 illustrated in FIG. 2. Process 150 can start with an OFF state 100, where the remote unit is powered down, for example with a dead or removed battery. Upon application of power, such as installation of a battery, a POWER-UP event 101 can be sensed by the microprocessor or external circuitry, causing a transition to a WAITING FOR RESET state 102. A reset button is installed in many remote units for the purpose of allowing re-initialization of the remote unit by the person installing the unit. In one embodiment, reset can also be accomplished via software, which can be useful if the remote ever becomes confused or has not heard from the master unit for a long time period utilizing a watchdog timer. A RESET event 103 can cause a transition to an INITIALIZING state 104. While in INITIALIZING state 104, typical initialization steps can be executed, such as performing diagnostics, clearing memory, initializing counters and timers, and initializing variables. Upon completion of initialization, indicated at 105, transition to a GETTING SLOTS state 106 can occur. GETTING SLOTS state 106 is discussed in greater detail below, and can include receiving a time slot for communication with the master and receiving frequency slots for transmitting to, and receiving from, the master. In one embodiment, the frequencies to utilize in the next transmission and the time remaining to the next transmission are determined or obtained by the remote unit in the GETTING SLOTS state. Upon completion of the GETTING SLOTS state, indicated at 107, the process transitions to a SLEEPING state 108.

SLEEPING state 108 is preferably a very low power consumption state in which the transceiver is able to neither transmit nor receive. In SLEEPING state 108, the controller circuitry or microprocessor is preferably in a very low power consumption state as well. While in SLEEPING state 108, the remote unit should be able to be awakened by timer interrupts or device sensor interrupts. In a preferred embodiment, the remote unit stays in SLEEPING state 108 indefinitely until awakened by an interrupt.

Upon reception of a SENSOR event 109, a transition to a TRANSMITTING ALARM state 110 can occur. During this transition or soon thereafter, the transceiver can be switched to a transmit mode. While in this state, an alarm transmission is performed, for example, on the transmission frequency determined in GETTING SLOT state 106. While in this state, transmission of other status or security information can also be performed. For example, the remote unit can transmit the length of time a contact has been open or the current battery voltage.

Upon completion of transmission, indicated at 111, a WAITING FOR ACKNOWLEDGE state 112 can be entered. While in this state, the transceiver can be switched to a receive mode at a receive frequency determined during GETTING SLOT state 106. While in this state, the remote is typically in a higher power consumption state relative to SLEEPING state 108. Upon reception of an ACKNOWLEDGEMENT from the master unit, indicated at 113, the remote unit can enter SLEEPING state 108 again. If an acknowledge is not received within a TIMEOUT period, indicated at 151, the alarm can be transmitted again, in TRANSMITTING ALARM state 110. A number of re-transmissions can be attempted.

The bi-directional nature of the remote units allows use of the acknowledgement function. The acknowledgement feature can remove the requirement of some current systems that the remote unit broadcast alarms at high power, repeatedly, and for long time periods. Current systems typically do not have remote units that know when their reported alarm has been received, thus requiring repeated transmissions and high power transmissions, even when a low powered, single alarm transmission by the remote could have been or had, in fact, been received.

SLEEPING state 108 can also be exited upon reception of a TIMEOUT event 115. In one embodiment, a timer is loaded with a time period determined during GETTING SLOT state 106. In one embodiment, a time to wait until transmitting status information, such as 300 seconds, is received from the master unit during GETTING SLOT state 106. The time to wait can either be used directly or adjusted with a margin of error to insure that the remote unit is not sleeping when the time period has elapsed. For example, a 360-second time to wait can be used in conjunction with a 5-second margin of error to awaken the remote unit for a receiving period from 355 seconds to 365 seconds. After reception of a TIMEOUT event 115, a status communicating step 114 can be executed, which can include setting the transceiver to either a transmit or a receive mode, discussed below.

In one embodiment, a WAITING FOR POLL state 116 can be entered, and the transceiver is set to a receive state at a receive frequency. In this embodiment, the remote does not transmit health status until polled by the master unit. The remote can remain in WAITING FOR POLL state 116 until time elapses, whereupon the remote unit can return to SLEEPING state 108 until the occurrence of the next time period has lapsed.

In one method, a POLL REQUEST 117 is received from the master unit and the remote unit transitions to a TRANSMITTING HEALTH state 118. While in the TRANSMITTING HEALTH state 118 or soon before, the remote unit transceiver can be put into a transmit state at the desired frequency.

In one embodiment, the poll request includes the desired transmit frequency to use. The health status and sensor data and sensor type of the remote unit can be transmitted at the desired transmit frequency. In one embodiment, a simple signal can be transmitted containing little information. In another embodiment, more information is included in the transmission. Information than can be transmitted includes remote unit ID, battery voltage, received master unit signal strength, and internal time. In some embodiments, sensor data is included in the TRANSMITTING HEALTH transmission. For example, in a room temperature sensor, the temperature can be transmitted as part of the health or status message. In this way, the periodic message used to insure that the remote unit is still functioning can also be used to log the current data from the sensors.

In some embodiments, the data is too energy intensive to obtain and only remote unit health information is transmitted. After completion of the TRANSMITTING HEALTH state 118, indicated at 119, a WAITING FOR ACK state 120 can be executed. A WAITING FOR ACK state is executed in some embodiments to await an acknowledgement and/or a synch signal. A synch signal can be used to reset an internal timer to be used in determining the next time to awake from SLEEPING state 108. A synch signal can be used to prevent small remote unit timer inaccuracies from accumulating into large inaccuracies over time and allowing the remote unit timing to drift from the master unit timing. In some embodiments, an acknowledge signal received from the master unit is used to reset the time interval used by timeout event 109. In some embodiments, the acknowledge signal includes a new time and/or frequencies to be used by the remote unit for the next SLEEPING state and transmission and receiving state. In this way, the master unit can maintain close control over the next health transmission time and the next receiving and transmitting frequencies. After reception of the ACK or synch signal indicated at 121, a CALCULATING NEW TIME state 122 can be executed, for determining a new time to be used to determine the timing of event 115.

In one method according to the present invention, after expiration of a timer, a TIMEOUT event 155 occurs which can lead to execution of TRANSMITTING HEALTH state 118 rather than WAITING FOR POLL state 116. After occurrence of TIMEOUT event 155, the remote unit can immediately transmit health data. In some embodiments, new transmission times, transmission frequencies, and flags indicating whether to wait for master unit polling are included in acknowledge or synch messages transmitted from master to remote.

Execution of TRANSMITTING HEALTH state 118 and subsequent steps are as previously described. In one embodiment, the decision of whether to generate TIMEOUT event 115 or 155 can be made in the remote, in response to a message received from the master. The process utilizing event 155 is preferred. The process utilizing event 115 is illustrated as an alternative embodiment suitable for some applications.

Remote units utilizing the present invention can thus remain asleep in a very low power consumption mode, neither receiving nor transmitting. One aspect of the present invention making this possible is the coordination of timing between master and remotes. Specifically, when the remote awakens and is able to receive over a window of time, the master should know the start time and time width of that time window to be able to transmit within that window if such a transmission is desirable. Specifically, when the master has allocated a time slot or window for receiving the health of a particular remote unit, that particular unit should transit its health within that time window in order to be heard.

Coordination between master and remotes can include coordination of what frequencies to use, whether a transmission has been received, what time interval to transmit health data in, and when to begin transmitting the health data. This coordination is preferably obtained with communication between master and remote units. In particular, communication from master to remote can establish which frequencies to use, when to transmit health data, and whether the last transmission of a remote was received by the master. The fact that this data can be received by the remote means that the remote can react by changing to a different transmitting frequency, changing to a different transmitting power, changing to a different effective time interval or time interval start, and can re-transmit in the absence of an acknowledgment from the master unit. With the time windows for periodic transmission of health data established between remote and master, the remote can sleep in a very low power mode for a high percentage of the time, changing to a higher power mode only to transmit sensor changes and to periodically transmit health or sensor data.

In one embodiment, only the master unit is aware of the overall timing or scheduling scheme of the security system, with the remotes being aware only of the time until the start of the next scheduled remote unit TRANSMITTING HEALTH state or the time until the start of the next remote unit WAITING FOR POLL period. In this embodiment, the amount of processing power required in the remote is held down while only the master is aware of the overall scheduling of time slots.

Adding receivers to the remote units allows adjustment of frequencies in response to communication difficulties. In a typical building installation, remote units are installed near doors and windows and a master unit is installed, often in a central location. Over time, especially in a commercial building, furniture, walls, doors, and dividers are added, which can attenuate RF radiation transmitted through the building, between remote and master units. Reflections can also occur, causing Raleigh cancellation at certain frequencies, greatly reducing the effectiveness of communication at certain frequencies at certain locations, such as in corners. Using bi-directional communication between master and remote units allows adaptive selection of frequencies over time without requiring any work in the field with either master or remote units.

Figure 5:
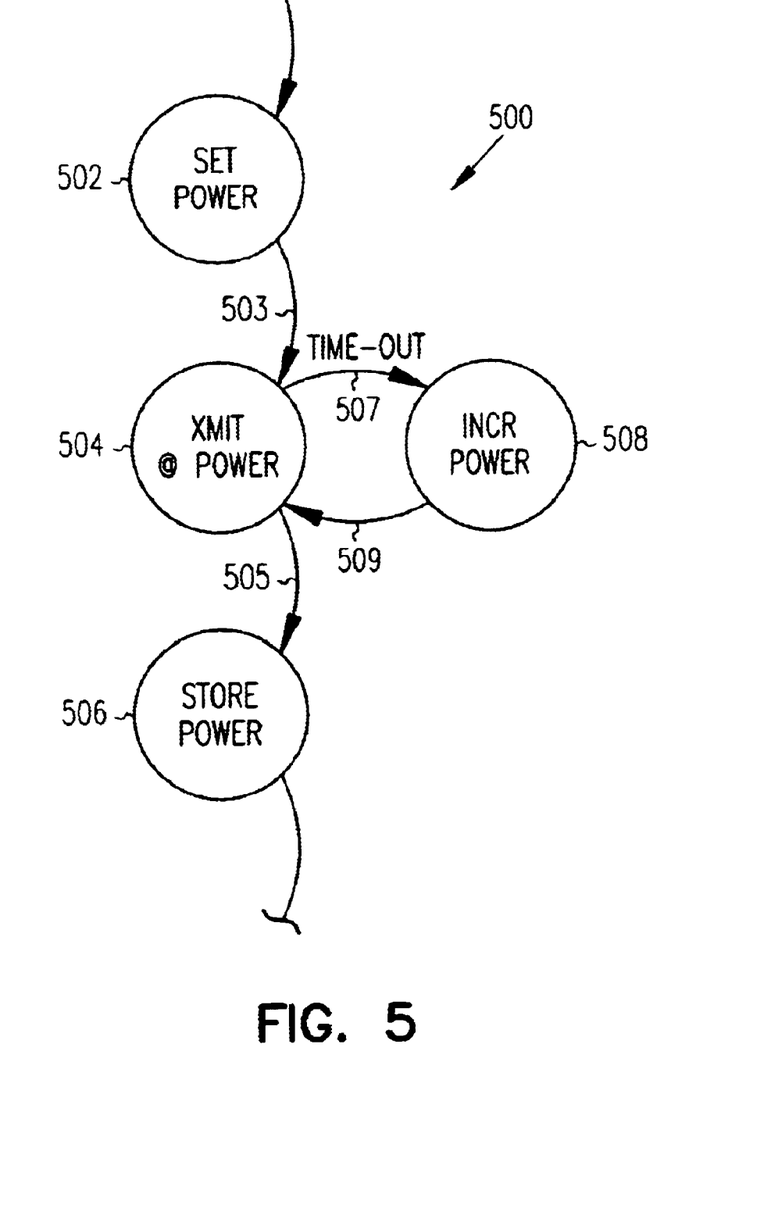
FIG. 5 is a high-level state transition diagram of a process which can execute in a remote unit, suitable for increasing transmitting power in response to the failure to receive acknowledgment from a master unit.

Referring now to FIG. 5, a method 500 for adjusting transmission power level in a remote unit is illustrated. Adjusting the transmission power level is desirable in many systems to conserve power and extend remote unit battery life. Method or process 500 can be used in systems both having power level feedback and in systems not having power level feedback. Power level feedback refers to a master unit having the capability to measure the power level of the signal received from the remote unit, and the ability to transmit that measured power level to the remote unit so that the remote unit can remain aware of how well its signal was being received by the master unit. Power level feedback also refers to embodiments where the power level itself may not be transmitted back to the remote units but an instruction to increase or decrease the transmitted power level is transmitted to the remote unit.

In an initializing step for the remote unit (not shown in FIG. 5) a desired working transmit power level variable can be set to a default setting, preferably to high level. This level can then be stored in memory in the remote unit for later retrieval. The initializing step in many embodiments is performed upon a power up or reset of the remote unit. The purpose of the initializing step is to set the initial power level to some value that can be used as a starting point for the remote. An initial high power level will increase the chance of reception by the master unit but may be higher than necessary and wasteful of battery life.

Process 500 can be part of any process used to transmit messages from the remote to the master unit. In one embodiment, process 500 is part of a periodic status message transmission process for transmitting from the remote unit to the master unit. In step 502, the current working transmit power level is restored to the value previously stored. After completion of step 502, indicated at 503, TRANSMITTING step 504 can be executed, and can include the remote unit transmitting a health or status message at the power level indicated by the current working transmit power level. If an acknowledge is received, indicated at 505, then a step 506 for storing the current working power level, is performed, storing the last successfully used power level. If no ACK is received, but rather there is a timeout, indicated at 507, then a step 508 increasing the currently used transmit power level can be executed, returning when done to 504, as indicated at 509. The message can be transmitted again at the new power level in step 504. This process can be repeated until the message is acknowledged or the power is set to the maximum level with no acknowledgment. In the embodiment illustrated in FIG. 5, the remote unit transmit power level is not decreased, a feature discussed below.

Process 500 thus illustrates a method for using the last successfully transmitted power level, while increasing the level if an acknowledge signal is not received in reply to a health status transmission. INCREASING POWER LEVEL step 508 can be handled in a number of different ways. In one embodiment, where transmit power is controlled by feeding power to a variable, discrete number of output stages, the power can be increased by incrementing the power to the level provided by the next higher combination of output stages. One such output buffer is shown and described in co-pending U.S. patent application Ser. No. 09/311,242, entitled "Output Buffer with Independently Controlled Current Mirror Legs", which has been incorporated herein by reference. In other embodiments having a continuously variable output level, the transmit power can be increased by increasing the level a certain percent. In one embodiment, the power level output is increased or decreased in about 10 percentage point increments.

Figure 6:
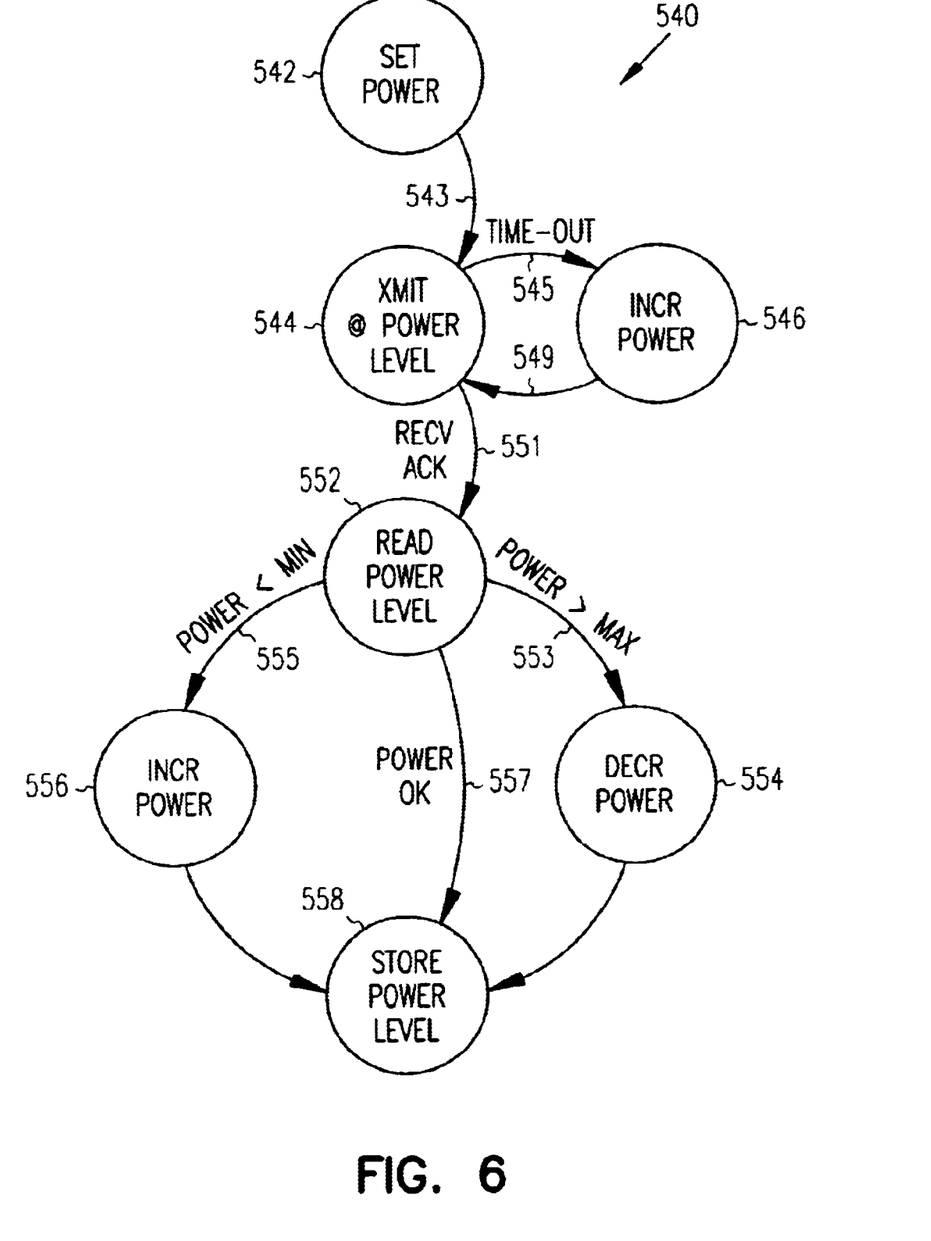
FIG. 6 is a high-level state transition diagram of a process which can execute in a remote unit, suitable for increasing, decreasing, or leaving unchanged the transmitting power in a remote unit in response to receiving an indication of the received signal strength at the master unit.

Referring now to FIG. 6, a process 540 is illustrated, for varying transmitting power in remote unit where the power level actually received by the master unit is measured and transmitted back to the remote unit. Process 540, like process 500, can be included in another process for communicating with the master unit. In step 542, the transmit power level is restored to the last stored value. After completion, indicated at 543, a health or status message can be transmitted in step 544 by the remote unit at the desired power level. If no acknowledge is received before a timeout period, indicated at 545, the power level is increased in step 546 and after completion, indicated at 549, returns to execute step 344 again. If an acknowledge is received, indicated at 551, the received power level is analyzed in step 552. If the power level received by the master unit is greater than a MAXIMUM, indicated at 553, power can be increased in step 554. If the power level received by the master unit is less than a MINNIMUM, indicated at 555, then the power level can be increased in step 556. If the power level is within a deadband around the target power level, indicated at 557, the last used power level can remain unchanged. In one embodiment, the analysis in step 552 is performed by the remote unit, using the received power level value and a desired maximum and minimum power level. In one embodiment, the maximum and minimum are calculated in the remote unit by adding and subtracting a deadband value from the target level.

In some embodiments, the target level is maintained and known only in the main unit, and the decision in step 552 whether to request an increase or decrease in transmit power is actually made in the main unit. In this embodiment, the decision to increase or decrease the transmit power of the remote is transmitted as a signal to the remote units. This embodiment has the advantage of keeping decision making centralized, which can include the advantage of changing the decision making with a single software upgrade rather multiple software upgrades to multiple remote units.

Figure 7:
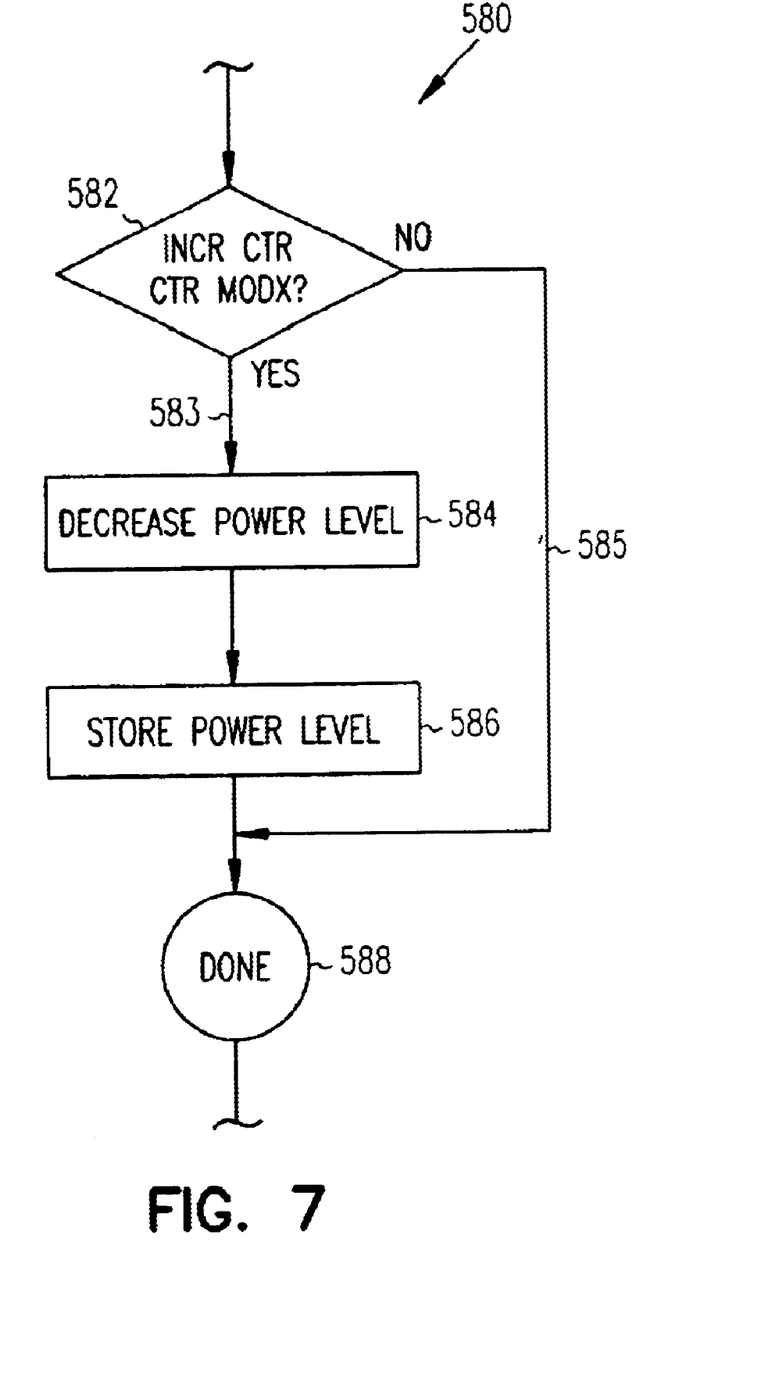
FIG. 7 is a flow chart of a process suitable for executing in a remote unit, suitable for periodically decreasing the transmitting power in a remote unit to insure that the transmitting power is not unnecessarily high.

Referring now to FIG. 7, a process or method 580 is illustrated for adjusting the transmitting power downward for a remote unit. Process 580 can be executed at different times, such as before or after a remote unit health or status transmission. In step 582, a counter is incremented and checked to see if it is evenly divisible by a number, such as 100. If the counter is modulo 100, indicated at 583, then step 584 is executed, which decreases the transmission power and stores the new transmission power level to be used in step 586. The process can finish at step 588. If the counter is not modulo 100, then the transmission power is left unchanged. Process 580 thus adjusts the power level downward at infrequent intervals. If conditions have remained unchanged, the transmission will be too weak after the downward change, and will either remain unacknowledged, or will be acknowledged but acknowledged as too weak, with a request to increase the power. As the requests to increase the power level can use power and bandwidth in some embodiments, the downward adjusting is preferably infrequent. In embodiments having a feedback of transmission power to the remote units, the downward adjusting may not be required. In such embodiments, the downward adjusting can be effectively accomplished by steps 552 and 554 in FIG. 6 instead. Steps 552 and 554 have the advantage of having analog measurements of the received transmission strength. Analog measurements can provide an indication of how much increase or decrease is suggested by how far off from a target value the actual value is.

The present invention can thus use the bi-directional communication capability of the remote units to receive indications of whether the transmissions were received by the master units and, in some embodiments, the received signal strength. Using these indicia of signal strength, the transmission power of the remote units can be decreased to save power, extending battery life, and can be increased to insure communication between remote and master units. The processes previously described were illustrated with respect to periodic status transmissions, but can be used in event transmissions as well. In some embodiments, event transmissions are transmitted at a level above that used for status transmissions. The use of a slightly higher power level for event transmission can be used to increase the probability of successful communication in situations where the power level has been temporarily adjusted downward as previously discussed.

By continuously monitoring and adjusting the transmit power of the remote units, changing circumstances can be accommodated without requiring any labor intensive reprogramming or re-configuring. In one example, the installation or removal of walls in a commercial building can be accommodated without requiring human intervention within the master or remote units. In another example, the placement of new furniture or mirrors can be accommodated without requiring reconfiguration. In yet another example, the presence or absence of large crowds can be accommodated with no manual intervention. At the same time, a low, battery extending power transmission level can continuously be maintained.

In addition to the advantages discussed above, for those applications where there are close independent controllable spaces such as in an apartment building, the present invention may increase the number of remote units that can be provided in each space. Because the signal strength of the radio frequency links is minimized, fewer signals will pass from one space to an adjacent space with sufficient strength to be detected by the master unit of the adjacent space. This may increase the number of time slots available in any given space, thereby potentially increasing the number of remote units that can be provided.

Having thus described the preferred embodiments of the present invention, those of skill in the art will readily appreciate that the teachings found herein may be applied to yet other embodiments within the scope of the claims hereto attached.

What is claimed is:

1. A building monitoring system for a building, comprising:

at least one master unit positioned in the building including a transceiver for transmitting a radio frequency signal and receiving a radio frequency signal;

a plurality of battery powered remote units positioned in the building said battery powered remote units including at least one sensor for sensing a predetermined parameter in the building and a transceiver for transmitting one or more radio frequency signals at least one of which relates to the sensed parameter to said master unit transceiver and receiving one or more radio frequency signals from said master unit transceiver, wherein said signals transmitted from said remote unit have a transmitted signal strength and said signals received by said master unit from said remote units have a received signal strength;

said master unit having acknowledging means for providing an acknowledge signal to acknowledge receipt of said received signal;

said remote units having detecting means for detecting said acknowledge signal;

said remote units further having means for increasing said transmitted signal strength when said detecting means does not detect said acknowledge signal; and said remote units having means for selectively decreasing said transmitted signal strength to conserve power.

2. A building monitoring system as recited in claim 1, wherein said master unit includes means for transmitting back said received signal strength to said remote units, wherein said remote units include means for receiving said transmitted back signal strength from said master unit, said remote units further including means for detecting when said received signal is too low by comparing said transmitted back signal with at least one signal strength target.

3. A building monitoring system as recited in claim 1, wherein said master unit includes means for transmitting back to said remote units an indication that said received signal strength is too low or too high, wherein said remote units include means for receiving said transmitted back signal strength indicator from said master unit.

4. A building monitoring system for a building, comprising:
   at least one master unit positioned in the building including a controller executing control logic coupled to a transceiver for transmitting a radio frequency signal and receiving a radio frequency signal;
   a plurality of battery powered remote units positioned in the building each without a co-located battery charging system, said battery powered remote units including at lease one sensor for sensing a predetermined parameter in the building and a controller executing control logic coupled to a transceiver for transmitting one or more radio frequency signals at least one of which relating to the sensed parameter to said master unit transceiver and receiving one or more radio frequency signals from said master unit transceiver, wherein said signals transmitted from said remote unit have a transmitted signal strength and said signals received by said master unit from said remote units have a received signal strength;
   wherein said master unit control logic causes an acknowledge message to be sent to said remote unit when a message is received from said remote unit; and
   wherein said remote unit control logic causes said transmit signal strength to be increased when said acknowledge message is not received in response to a remote unit transmitted message.

5. A building monitoring system for a building, comprising:
   at least one master unit including a controller executing control logic coupled to a transceiver for transmitting a radio frequency signal and receiving a radio frequency signal;
   a plurality of battery powered remote units positioned in the building each without a co-located battery charging system, said battery powered remote units including at lease one sensor for sensing a predetermined parameter in the building and a controller executing control logic coupled to a transceiver for transmitting one or more radio frequency signals at least one of which relating to the sensed parameter to said master unit transceiver and receiving one or more radio frequency signals from said master unit transceiver, wherein said signals transmitted from said remote unit have a transmitted signal strength and said signals received by said master unit from said remote units have a received signal strength;
   wherein said master unit control logic causes a received signal strength message to be sent to said remote unit when a message is received from said remote unit, wherein said received signal strength message includes a received signal strength indication; and
   wherein said remote unit control logic causes said transmit signal strength to be changed in response to said received signal strength indication.

6. A building monitoring system as recited in claim 5, wherein said remote unit control logic includes a target received signal strength and said logic causes said transmit signal to be increased in response a received signal strength too far below said target and decreased in response to a received signal strength too far above said target.

7. A building monitoring system as recited in claim 5, wherein said master unit control logic includes a target received signal strength and said logic causes a first message to be sent to said remote unit when said received signal strength is too far below said target and a second message to be sent to said remote units when said received signal strength is too far above said target.

8. A building monitoring system of claim 5, wherein at least one of said battery powered remote units transmits a signal related to the sensed parameter when the sensed parameter changes by a predetermined amount, the sensed parameter being related to at least one environmental condition in the vicinity of the sensor.

9. A building monitoring system of claim 8, wherein the at least one battery powered remote units are in a lower power sleep mode when the sensed parameter does not change by a predetermined amount.

10. A building monitoring system of claim 5, wherein at least one of said battery powered remote units transmits a signal related to the sensed parameter at predetermined intervals, the sensed parameter being related to at least one environmental condition in the vicinity of the sensor.

11. A building monitoring system of claim 10, wherein the at least one battery powered remote units are in a lower power sleep mode between the predetermined intervals.

12. A building monitoring system as recited in claim 5 further comprising means for detecting when said received signal strength is too low, wherein the means for detecting when said received signal is too low is located in the master unit, and the remote unit does not include a means for detecting the transmitted signal strength.

13. A building monitoring system as recited in claim 12, wherein the master unit provides a command to the remote unit to increase the transmitted signal strength when the detecting means of the master unit determines that the received signal strength is too low.

14. A building monitoring system as recited in claim 12, wherein the master unit provides a command to the remote unit to decrease the transmitted signal strength when the detecting means of the master unit determines that the received signal strength is too high.

15. In a building monitoring system including at least one master unit and a plurality of remote units, each positioned in a building, said master and remote units having transceivers, a method for minimizing power consumption in said remote units comprising the steps of:
   decreasing power consumption in said remote units by periodically decreasing transmitted signal strength from said remote units; and
   increasing transmitted signal strength from remote units in response to non-acknowledgment of signals sent from said remote units to said master unit.

16. In a building monitoring system including at least one master unit and a plurality of remote units, said master and remote units having transceivers, a method for minimizing power consumption in said remote units comprising the steps of:
   transmitting signals from said remote units to said master unit, said transmitted signals having a transmitted signal strength and a received signal strength;
   measuring said received signal strength at the master unit but not measuring the transmitted signal strength at the remote unit;

determining an appropriate transmit signal strength for the remote unit at the master unit;

transmitting back a signal strength command to said remote unit; and executing the signal strength command in the remote unit, causing said remote unit to change the transmitted signal strength.

17. A method for minimizing power consumption in a building monitoring system remote unit as recited in claim 16, wherein execution of said signal strength command by said remote unit causes said remote unit transmitted signal strength to increase or decrease.

18. A method for minimizing power consumption in a building monitoring system remote unit as recited in claim 17, wherein said signal from said master includes a first signal strength command to increase said remote transmitted signal strength when said received signal strength is too much less than a target received strength, and includes a second signal strength command to decrease said remote unit transmitted signal strength when said received signal strength is too much greater than said target received signal strength.

19. A method for minimizing power consumption in a building monitoring system remote unit as recited in claim 16, wherein said signal strength command includes a quantitative measure of a desired remote transmitted signal strength.

20. A method for minimizing power consumption in a building monitoring system remote unit as recited in claim 19, wherein said remote unit transmitted signal strength is increased when said received signal strength is too much less than a target signal strength and said remote unit transmitted signal strength is decreased when said received signal strength is too much greater than said target signal strength.

* * * * *